United States Patent
Bassolino et al.

(10) Patent No.: US 6,754,974 B2
(45) Date of Patent: Jun. 29, 2004

(54) DISTANCE-COMPARISON DEVICE

(76) Inventors: Antonio Bassolino, 12 Drew Pl., Madison, NJ (US) 07940; Jonathan Andrew DiLauri, 9 Vultee Dr., Florham Park, NJ (US) 07932

( * ) Notice: Subject to any disclaimer, the term of this patent is extended or adjusted under 35 U.S.C. 154(b) by 0 days.

(21) Appl. No.: 10/243,207

(22) Filed: Sep. 13, 2002

(65) Prior Publication Data

US 2004/0049938 A1 Mar. 18, 2004

(51) Int. Cl.[7] ............................................... G01B 3/10
(52) U.S. Cl. ......................................... 33/759; 33/1 G
(58) Field of Search ........................ 33/759, 1 G, 1 H, 33/755, 758, 760, 761, 764, 767, 768, 769, 770

(56) References Cited

U.S. PATENT DOCUMENTS

| | | | | |
|---|---|---|---|---|
| 661,483 A | * | 11/1900 | Barrie | 33/27.03 |
| RE14,409 E | * | 12/1917 | Saxton | 33/769 |
| 3,031,783 A | * | 5/1962 | Burke | 33/760 |
| 3,269,015 A | * | 8/1966 | Barker | 33/27.08 |
| 3,678,592 A | * | 7/1972 | Williamson | 33/289 |
| 3,834,030 A | * | 9/1974 | Hanson | 33/759 |
| 4,194,703 A | | 3/1980 | Roe | |
| 4,663,854 A | | 5/1987 | Miller et al. | |
| 4,880,232 A | * | 11/1989 | Lang | 33/759 |
| D307,726 S | | 5/1990 | Amico | |
| 5,253,421 A | * | 10/1993 | Landmark | 33/27.03 |
| 5,782,007 A | * | 7/1998 | Harris | 33/768 |
| 6,276,071 B1 | | 8/2001 | Khachatoorian | |
| 6,363,622 B1 | | 4/2002 | Stratton | |
| 6,405,451 B1 | | 6/2002 | Hsu | |
| 6,578,274 B1 | * | 6/2003 | Tango et al. | 33/1 G |

* cited by examiner

Primary Examiner—Christopher W. Fulton

(57) ABSTRACT

A new device ancillary to the game of bocce that enables the user to compare the distances between the target ball and two or more player balls for the proper awarding of game points or determining player throwing order. The device consists of a lower housing upon which an upper housing, containing a tape assembly, is rotatably mounted. In operation, the lower housing is placed over the target ball. Next, a tape is extended from the upper housing to make contact with one of the player balls. Then, the tape is locked at the extended position and the upper housing is rotated toward the second player ball. Finally, the comparison of the players' balls distances from the target ball is accomplished by observing whether the extended tape makes contact with the second player ball.

8 Claims, 4 Drawing Sheets

DISTANCE-COMPARISON DEVICE

FIELD OF INVENTION

The present invention relates to the game of bocce, wherein the object of the game is to project a player ball closest to a target ball, in particular, to a new device for determining which player's ball is closest to the target ball for the purposes of awarding points or determining player throwing order.

BACKGROUND OF THE INVENTION

Court games, pitting individuals or teams against each other testing skill and coordination, are well known. Such games may be played either outdoors or indoors. Bocce, for example, is an extremely popular recreational activity. In bocce, a target ball, known as a palline, is first thrown by one of the players. Each player then projects a player ball, having a unique color to distinguish from the opponent's balls, toward the target ball in an effort to position his or her ball closest to the target ball. After each player throws one ball each, the distance from the target ball to the two player balls is compared to determine which player's ball is farther from the target ball. The player ball farthest from the target ball will throw next. This process continues until all balls have been thrown, thereby completing the round.

Upon completion of a round, the scoring for the round must be determined. Scoring is conducted as follows. The player ball that is closest to the target ball is awarded one point. A player receives one point for each ball that is positioned closer to the target ball than the closest of the opponent's balls.

Previously, comparison of the relative distances from the player balls to the target ball has been accomplished by a variety of inefficient and imprecise means and devices. For example, a multitude of bocce players utilize antiquated methods involving the use of their feet or fingers to compare ball distances. The inherent drawbacks to these methods are substantial. The fundamental problem with such methods is the capacity for human error and lack of uniform application.

Also used in the field, is a telescopic measuring device. The telescopic measuring device is approximately the size of a pen. Extension of the telescopic measuring device for comparison is similar to that of an expandable antenna. Measurement is taken by lining up one end of the telescopic measuring device to an arbitrary point of reference on the target ball and extending the other end of the telescopic measuring device to the approximate center of the player ball. The telescopic measuring device, maintained at the extended length, must be lined up with the exact same point of reference on the target ball and the approximate center of the other player ball being compared. A caliper, attached to the telescopic measuring device, is used when distances between the target ball and the player ball are smaller than the telescopic measuring device itself.

However, the telescopic measuring device in application allows a great deal of room for human error and leads to imprecise comparisons. The problems with the telescopic measuring device are largely due to the fact that the device must be lined up on the exact same point of reference on the target ball for both independent measurements. The inability to maintain the same reference point on the target ball results in inaccurate comparisons and renders the telescopic measuring device a substandard device for measurement in the game of bocce.

The game of bocce currently lacks any uniform standard device for the comparison of player balls' distance from the target ball. The entire game of bocce depends on such a comparison for fair and accurate determinations of player turn and awarding of points. Due to the nature of the scoring system described above, an accurate determination of the closest player ball to the target ball is essential. In the context of a game of bocce, the actual distance between the target ball and the players' balls is irrelevant. Instead, a precise comparison of the opposing player balls is required to optimally achieve accurate scoring thus eliminating any player disagreement. Such a comparison can only be accomplished with the help of a device, which provides an accurate and precise comparison of the player balls in relation to the target ball.

SUMMARY OF THE INVENTION

The present invention describes a new device appurtenant to the game of bocce that provides an easy and accurate comparison of the distance between opposing players' balls and the target ball. Advantageously, the device is placed over the target ball providing a stable focal point of reference from which a comparison tape can extend toward the first player ball. The device provides a means for locking the comparison tape at an extended position. Further, the upper portion of the device can easily rotate toward the second player ball for a quick and accurate determination of which player ball is closer to the target ball. The inventive device offers a fast, easy, reliable and accurate way of determining which of two or more player balls is closest to the target ball. The device has applications in the game of bocce as well as other court games in which scoring is predicated upon comparison of distances among player and target objects.

BRIEF DESCRIPTION OF THE DRAWINGS

The advantages, nature and various additional features of the invention will appear more fully upon consideration of the illustrative embodiments shown in the accompanying drawings described in detail below. In the drawings.

It is to be understood that these drawings are for the purpose of illustrating the concepts of the invention and are not to scale.

DETAILED DESCRIPTION OF THE INVENTION

The applicant has discovered a new device for use in the game of bocce, which allows a fast, easy and accurate comparison of the distances between the target ball and two or more player balls. It should be appreciated that the invention is applicable to all field games in which the goal of the game is to project a player object close to a target object.

In FIGS. 1 through 4A–4B, the invention is illustrated with reference to the distance-comparison device 50 having three main components. The present invention offers many unique advantages over the prior art. Namely, the device enables uniform comparison with minimal potential for human error. Further, the device, once placed over the target ball, provides a focal point and free 360° rotation for comparison of player balls distributed about the playing area. Finally, the device provides fast and accurate comparison of the distances between respective player balls and the target ball for the appropriate awarding of points and determination of player turn, in the game of bocce.

Figure 1:
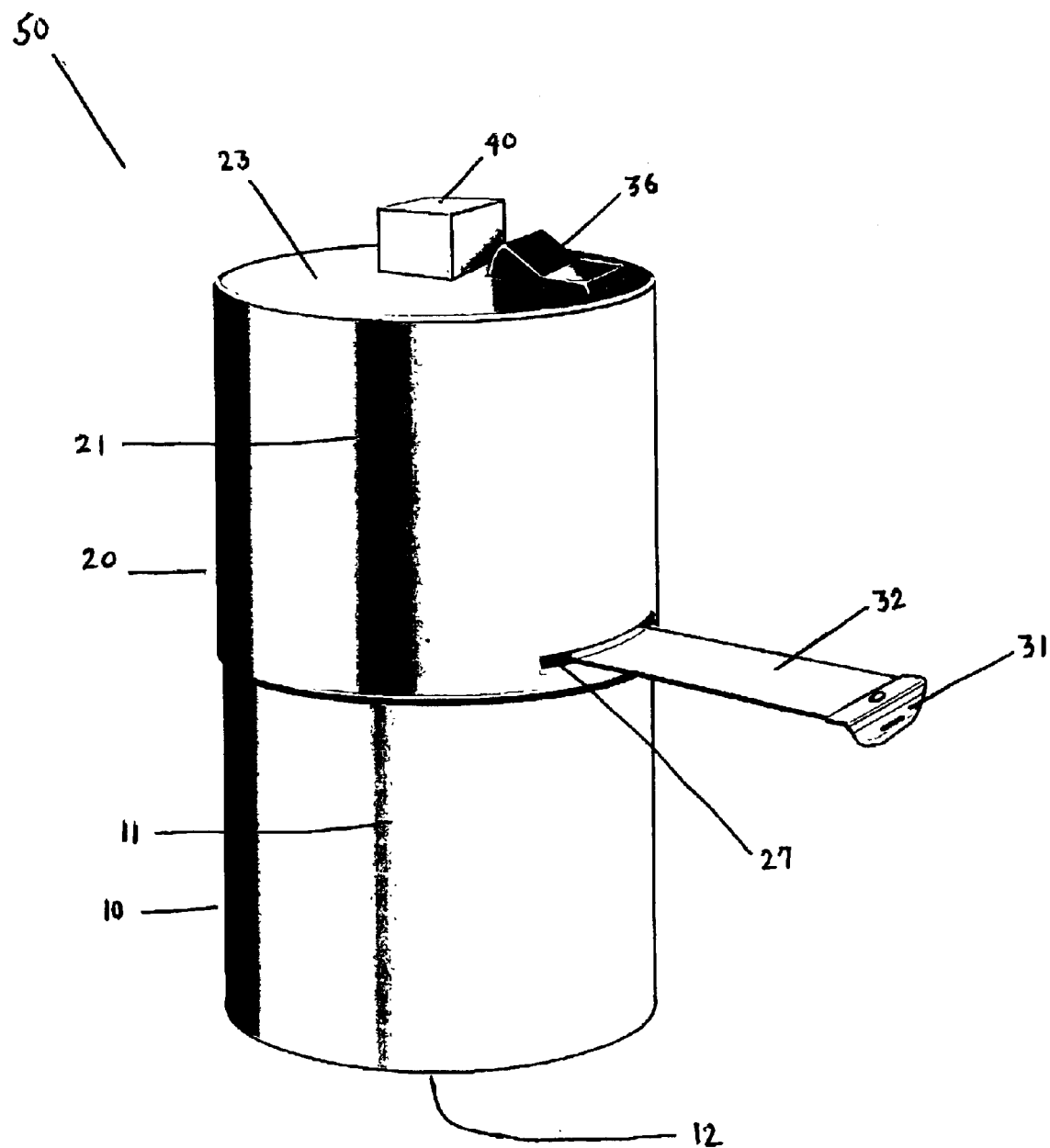
FIG. 1 shows a perspective view of one embodiment of the inventive distance-comparison device.

Referring to the drawings, FIG. 1 shows a perspective view of the inventive distance-comparison device 50. In this embodiment, the device 50 comprises three components, a lower housing unit 10, an upper housing unit 20 and a comparison assembly 30 although in FIG. 1, only two components of the device, namely, the lower housing unit 10 and the upper housing unit 20, are visible. The lower and upper housing units are shown substantially in the shape of a cylinder, each having a cylindrically shaped outer side surface, although other configurations and shapes are contemplated. For example, the lower housing unit 10 could be in a conical shape, pear-shaped, dome-shaped i.e. rounded or elliptical, with the important consideration being that the lower housing be sized to fully encase the target ball without disruption of the target ball's position.

Figure 3:
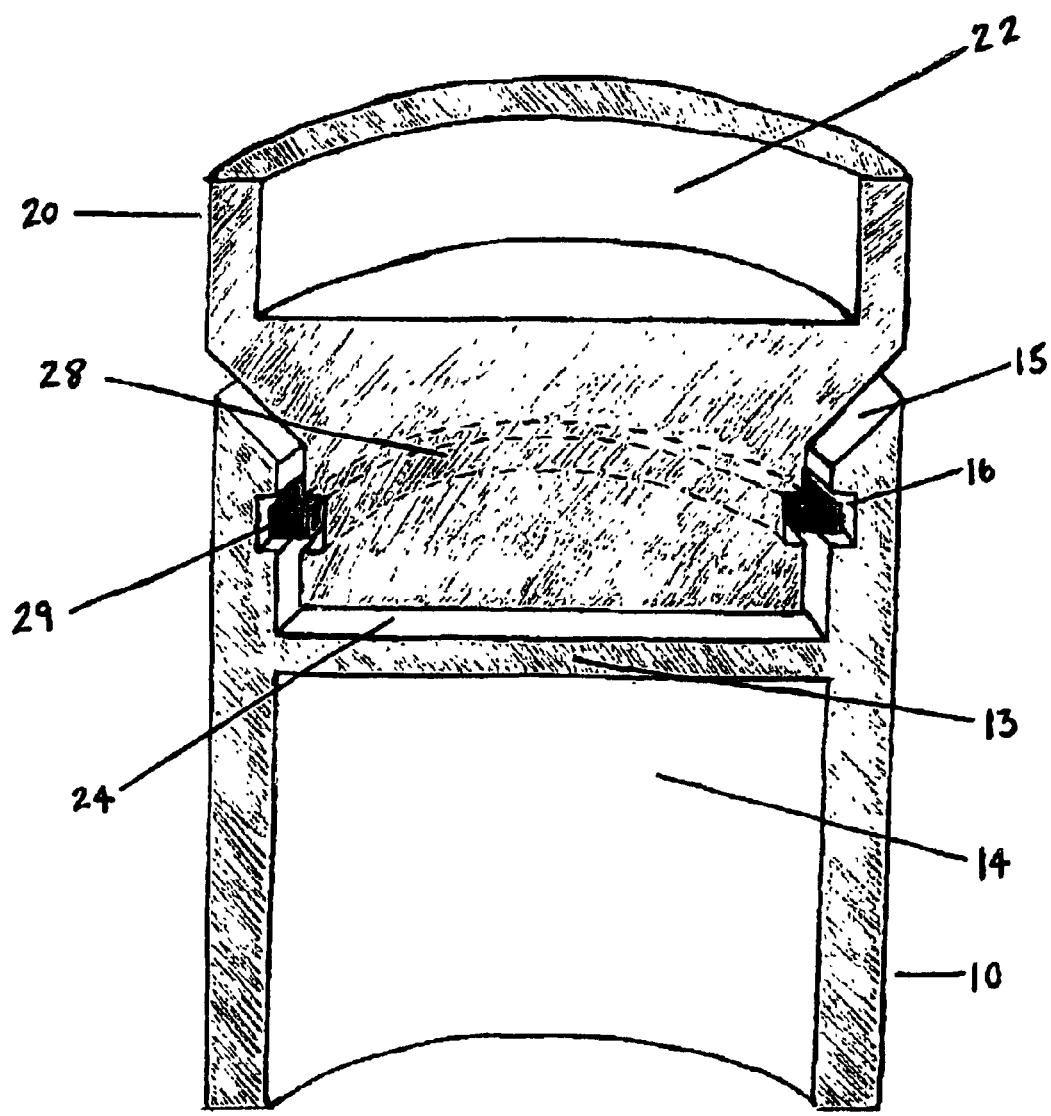
FIG. 3 shows a cross-sectional perspective of one embodiment of the lower housing unit and upper housing unit interlocking mechanism.

The lower housing unit 10 has an open base 12, a top surface 13, a cylindrically shaped outer side surface 11, and a cylindrically shaped inner side surface 14. The top surface 13 and the inner side surface 14 are shown in FIG. 3. The open base 12 is so dimensioned to fully encompass a target ball. The diameter of the open base should be slightly larger than the target ball to allow the lower housing unit 10 to encase the target ball without making contact with the target ball. The height of the lower housing unit must be sufficient to completely accommodate housing of the target ball.

Referring to the drawings, FIG. 3 shows extending from the periphery of the top surface 13 of the lower housing unit is an angled rim 15. Below the angled rim 15, carved into the inner side surface 14, is a first ring-shaped groove 16.

Figure 2:
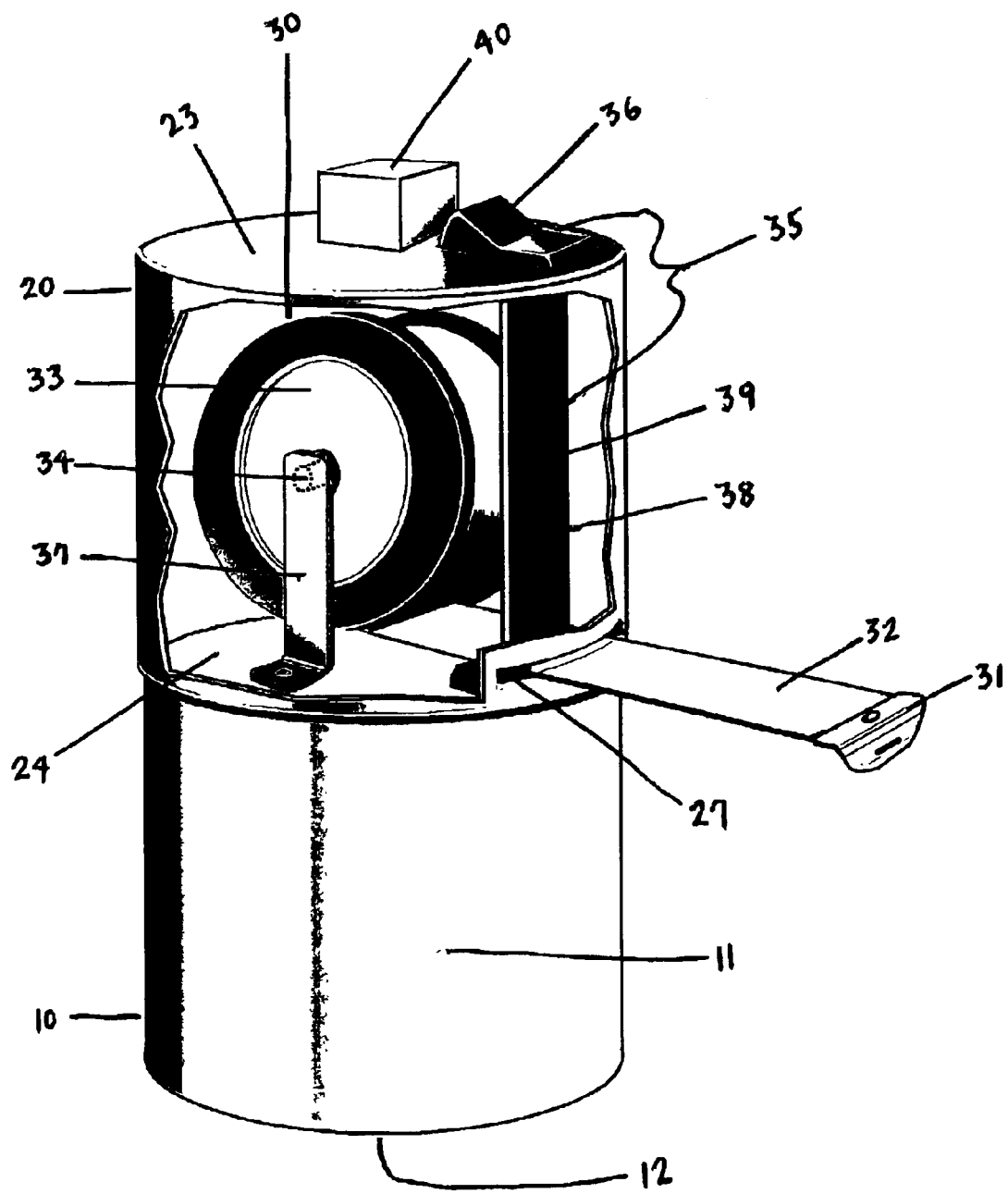
FIG. 2 shows a cut away view illustrating the internal components of the upper housing unit of one embodiment of the distance-comparison device.

The upper housing unit 20 has a cylindrically shaped outer side surface 21, a cylindrically shaped inner side surface 22, a top surface 23, and a bottom surface 24. The top surface 23 is shown in FIG. 2. A second ring-shaped groove 28 is carved into the outer side surface 21 along the bottom of the upper housing unit 20. Preferably, the upper and lower housing units are fabricated with any suitable plastic material. Further, the lower housing unit may be fabricated with a material having transparent qualities to allow the user to view the target ball placement within the lower housing unit.

A compliant ring 29 is fit into the second groove 28 of the upper housing unit 20. The ring 29 is adapted such that upon the application of a uniform force to the outer surface of the ring, the ring will compress. Further, upon removal of the force, the ring 29 will expand to its original circumference. The ring 29 is further adapted to have a slightly larger circumference than the circumference of the upper housing unit 20. Preferably, the ring 29 is fabricated with a suitable metallic substance that compresses upon the application of a force and decompresses when the force is removed.

When the upper housing unit 20 is pushed upon the lower housing unit 10, a force is applied to the ring 29 by the angled rim 15, whereby the force compresses the ring 29. The compression of the ring 29 allows the upper housing unit 20 to fit into the lower housing unit 10. The ring 29 remains in a compressed position until it aligns with the first groove 16 of the lower housing unit 10. Upon alignment, the ring decompresses into its natural position and snap-fits into the first groove 16 thus interlocking the upper and lower housing units. The upper and lower housing units in the interlocked position are shown in FIG. 3. Other means of interlocking the upper and lower housing units are contemplated with the important consideration being that the upper housing unit can freely rotate upon the lower housing unit about an axis perpendicular to the playing surface upon which the distance-comparison device 50 is placed.

Referring to the drawings, FIG. 2 shows a mechanically operated comparison assembly 30 mounted upon the bottom surface 24 of the upper housing unit 20. The comparison assembly 30 is similar to many commercially available tape measures. The comparison assembly 30 is comprised of a locking mechanism 35 and a spring-loaded, coilable comparison tape 32 rotatably mounted around a spool 33. Further, the comparison tape 32 has a rigid tab 31 extending perpendicularly from the end of the tape. The comparison tape 32 is biased to recoil around the spool 33 when the free end having the rigid tab 31 is pulled externally to perform a comparison. This spool 33 is also rotatably mounted around an axle 34. The axle 34 is fastened to the bottom surface 24 by two parallel brackets. The brackets hold the axle 34, upon which the spool 33 is rotatably mounted, parallel to the bottom surface 24. The spool is secured in such a manner as to allow the comparison tape 32 to pass through an aperture 27 in a path or direction parallel to the bottom surface 24 of the upper housing unit 20. This parallel path allows for the introduction of the locking mechanism 35.

The locking mechanism 35 is comprised of a superiorly located locking button 36 and a slide bar 39. Upon depression of the locking button 36, the slide bar 39 moves in a downward direction to apply pressure to the comparison tape 32 thus pressing the comparison tape 32 against the bottom surface 24 of the upper housing unit 20. When the comparison assembly 30 is in this locked position, the comparison tape 32 is unable to extend or recoil and the current position of the comparison tape is fixed. The comparison tape will remain in the fixed position until the locking button 36 is returned to the unlock position. Examples of the comparison assembly used in the present invention can be seen in U.S. Pat. No. 6,276,071 to Khachatoorian, U.S. Pat. No. 4,194,703 to Roe, and U.S. Pat. No. 4,663,854 to Miller et al.

Advantageously, the comparison tape 32 has a concave shape to ensure the tape will maintain rigidity upon extension from the distance-comparison device. Preferably, the comparison tape is composed of a metallic material. In operation, the comparison tape 32 will extend parallel to the playing surface with the rigid tab 31 serving as a handle for the user and preventing the strip from retracting past the aperture 27 when the comparison tape recoils.

The inner side surface 22 and outer side surface 21 of the upper housing unit have an aperture 27 to allow for the passing of the comparison tape 32. The aperture 27 should be positioned at a height from the open base 12 of the lower housing unit 10 equivalent to approximately the midpoint of the height of the player balls. Further, the aperture 27 should be positioned near the bottom of the upper housing to allow the slide bar 39 to press the comparison tape 32 against the bottom surface 24 of the upper housing unit 20. The upper housing unit should have a diameter sufficient to fully enclose the comparison assembly. Notably, the size of the comparison assembly is a function of the length of the comparison tape. Therefore, the upper housing unit can be so adapted to accommodate different length comparison tapes.

Mounted on the top surface 23 of the upper housing unit is a knob 40. The knob 40 allows the user to manually rotate the upper housing unit. Also exteriorly mounted on the top surface 23 of the upper housing unit is a locking button 36. The locking button is so adapted to have a lock and unlock position.

Figure 4A:
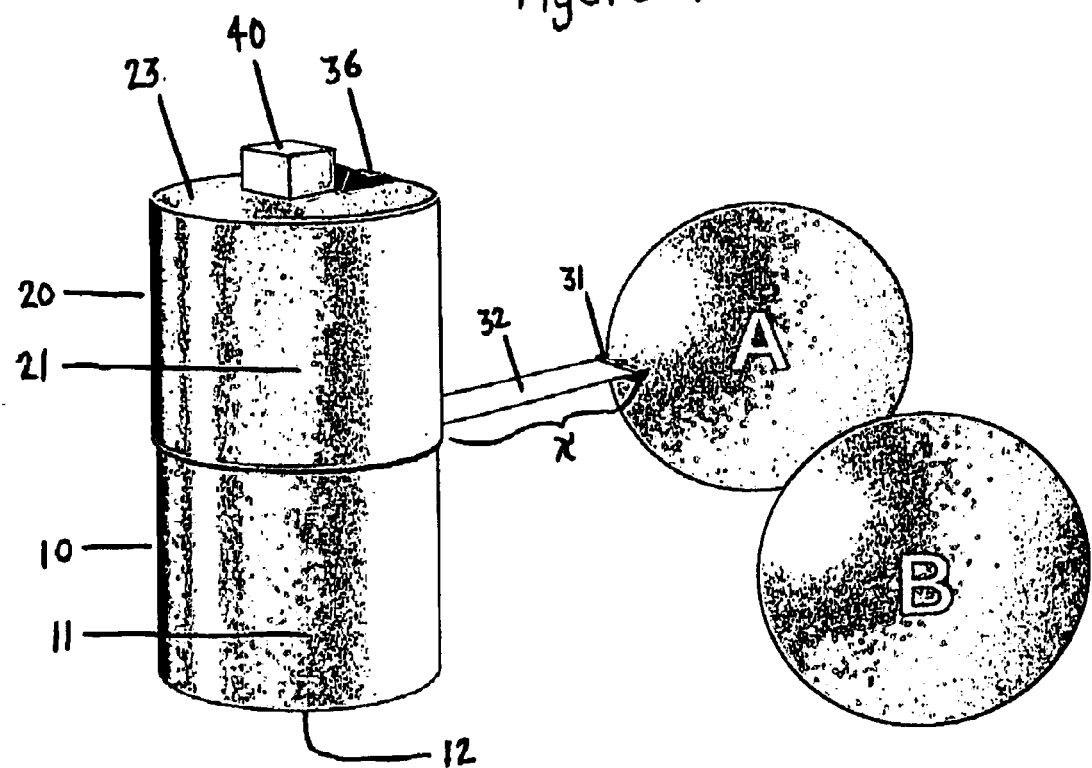
FIGS. 4A–4B show a perspective view of one embodiment of the inventive distance-comparison device in operation.
Figure 4B:
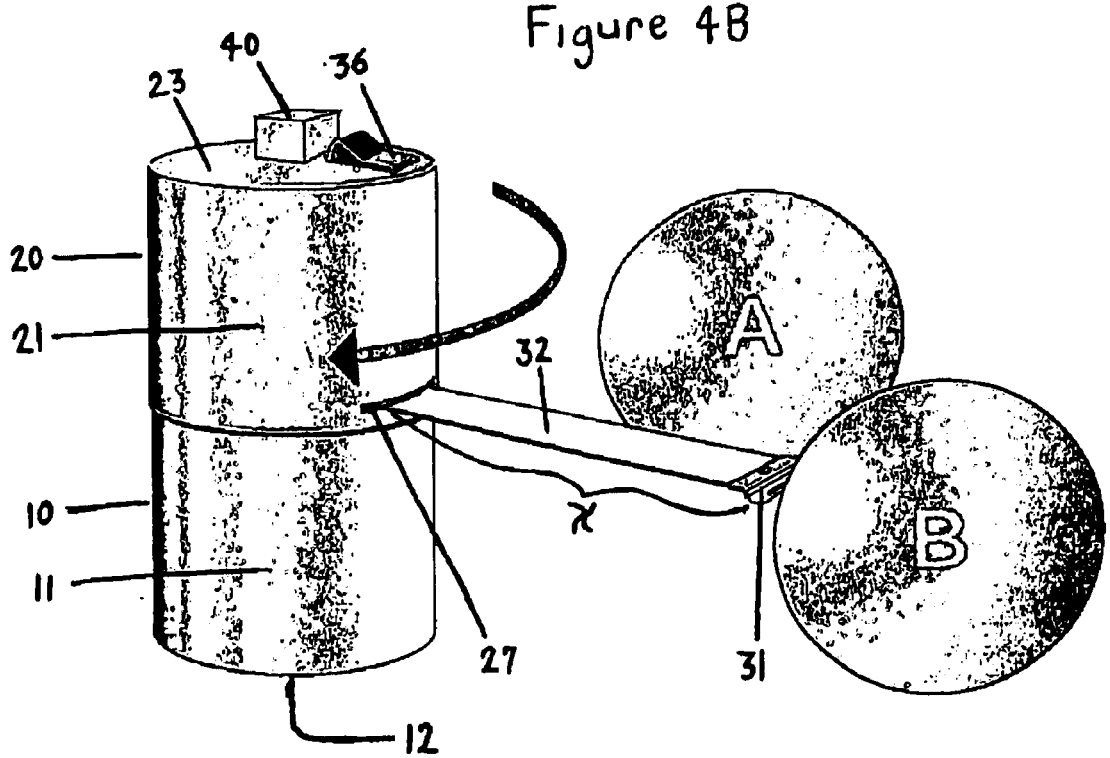

FIGS. 4A and 4B show the distance-comparison device 50 in operation. Referring to FIG. 4A, the device is placed over the target ball entirely encompassing the target ball. Then, the user takes hold of the rigid tab 31 and pulls the comparison tape 32 a distance x until contact is made by the tab and the approximate center point of player ball A. The user will push the locking button 36 into the lock position to secure the comparison tape 32 at the tape's current length x. The user holds the knob 40 and rotates the upper housing unit and comparison tape 32 in the direction of player ball B in an effort to align the comparison tape with the center point of player ball B. If, upon alignment with the center point of player ball B, the comparison tape 32 does not make contact with player ball B then the distance-comparison device shows that player ball A is closer than player ball B to the target ball. However, if the comparison tape 32 does make contact with player ball B prior to alignment with the center of player ball B then the distance-comparison device shows that player ball B is closer to the target ball than player ball A.

FIG. 4B shows the locked comparison tape 32 after rotation toward player ball B and aligned with the approximate center of player ball B. As clearly shown in FIG. 4B, the comparison tape 32 does not make contact with player ball B indicating that player ball A is closer to the target ball than player ball B.

It is to be understood that the above-described embodiments are illustrative of only a few of the many embodiments that can represent the invention disclosed. Numerous and varied other arrangements can be made by those skilled in the art without departing from the spirit and scope of the invention.

The claimed invention is:

1. A distance-comparison device comprising:

a lower housing unit having a cylindrically shaped inner and outer side surface, a top surface and a cylindrically shaped open base wherein said open base is so dimensioned to fully encompass a target ball without disrupting the position of the target ball;

an upper housing unit adapted to be interlocked with said lower housing unit wherein said upper housing unit rotates freely 360° upon said lower housing unit;

a comparison assembly adapted to be fastened within said upper housing unit.

2. The distance-comparison device of claim 1, wherein said upper housing unit has a cylindrically shaped side surface with one aperture, a bottom surface and a top surface.

3. The distance-comparison device of claim 2, wherein a knob and a button are mounted upon said top surface of said upper housing unit.

4. The distance-comparison device of claim 2, wherein said upper housing unit has a groove carved into said cylindrically shaped side surface and a ring mounted within said groove.

5. The distance-comparison device of claim 1, wherein said lower housing unit and said upper housing unit are fabricated with a plastic material.

6. The distance-comparison device of claim 1, wherein said lower housing unit is fabricated with a transparent plastic material.

7. The distance-comparison device of claim 1, wherein said lower housing unit is adapted with an angled rim extending along the periphery of said top surface and a groove carved into said inner cylindrically shaped side surface.

8. The distance-comparison device of claim 7, wherein said ring is fabricated with a complaint metallic material capable of compression.

\* \* \* \* \*